United States Patent [19]

Fujikawa

[11] Patent Number: 4,703,973

[45] Date of Patent: Nov. 3, 1987

[54] MOUNTING APPARATUS FOR A VEHICLE WINDOW

[75] Inventor: Yoshihiro Fujikawa, Aichi, Japan

[73] Assignee: Toyota Jidosha Kabushiki Kaisha, Japan

[21] Appl. No.: 11,452

[22] Filed: Feb. 5, 1987

Related U.S. Application Data

[63] Continuation of Ser. No. 639,218, Aug. 9, 1984, abandoned.

[30] Foreign Application Priority Data

Sep. 2, 1983 [JP] Japan .............................. 58-137010[U]
Sep. 2, 1983 [JP] Japan .............................. 58-137011[U]

[51] Int. Cl.4 ............................................. B60J 1/00
[52] U.S. Cl. ................................ 296/201; 296/84 A; 296/93; 52/208; 52/717.1
[58] Field of Search ............... 296/84 R, 84 A, 84 D, 296/93, 201; 52/208, 397, 400, 716–718; 24/289, 290, 293–295

[56] References Cited

U.S. PATENT DOCUMENTS

| 3,155,422 | 11/1964 | Campbell et al. ...................... 52/397 |
| 3,245,182 | 4/1966 | Zierold .................................. 52/208 |
| 3,274,740 | 9/1966 | Hall ...................................... 52/208 |
| 3,714,751 | 2/1973 | Lackey .................................. 52/400 |
| 3,774,363 | 11/1973 | Kent ..................................... 52/718 |
| 3,851,433 | 12/1974 | Colucci ................................. 52/718 |
| 3,925,947 | 12/1975 | Meyers et al. ......................... 52/397 |
| 4,135,277 | 1/1979 | Taniai et al. .......................... 52/400 |
| 4,261,610 | 4/1981 | Inamoto ................................ 296/84 R |

FOREIGN PATENT DOCUMENTS

| 1005389 | 3/1957 | Fed. Rep. of Germany .... 296/84 R |
| 3008551 | 9/1981 | Fed. Rep. of Germany ...... 296/201 |
| 0020522 | 2/1977 | Japan ................................ 296/84 A |
| 37705 | 9/1978 | Japan . |
| 63208 | 10/1978 | Japan . |
| 106109 | 1/1979 | Japan . |
| 27110 | 8/1979 | Japan . |
| 136811 | 3/1980 | Japan . |
| 415 | 5/1980 | Japan . |
| 76122 | 10/1980 | Japan . |
| 141113 | 2/1981 | Japan . |
| 35416 | 9/1981 | Japan . |
| 24574 | 5/1982 | Japan . |
| 54315 | 4/1983 | Japan . |
| 135310 | 9/1983 | Japan . |

Primary Examiner—Dennis H. Pedder
Attorney, Agent, or Firm—Finnegan, Henderson, Farabow, Garrett & Dunner

[57] ABSTRACT

A mounting apparatus for a fixed vehicle window includes a retention member, a molding member, and a sealing member. The retention member is secured to an interior portion of a vehicle body for supporting the window glass. The retention member includes a base plate portion secured to the interior portion and a side plate portion extending outward from the base plate poriton, the side plate portion extending between the interior poriton of the vehicle body and the window glass. The retention member also includes a retention plate extending from the side plate portion and aligned along an inner surface of the window glass for limiting movement toward the vehicle body. In addition, a projection plate extends from the side plate portion and terminates along an end surface of the window glass for restricting the window glass from sliding relative to the retention plate portion. The molding member is attached to the projection plate portion of the retention member and includes a panel portion for clamping the window glass to limit movement of the window glass away from the interior poriton of the vehicle body. The sealing member is mounted between the vehicle body and the inner surface of the window glass.

5 Claims, 11 Drawing Figures

MOUNTING APPARATUS FOR A VEHICLE WINDOW

This application is a continuation, of application Ser. No. 639,218, filed Aug. 9, 1984, abandoned.

BACKGROUND OF THE INVENTION

1. Field of the Invention

The present invention relates to a mounting construction of window glass for vehicle, particularly, of a fixed type.

2. Description of the Prior Art

In the windshield glass for the vehicle, there are two types, one of which is an opening and closing type and the other is a fixed type. The windshield glass of the opening and closing type and that of the fixed type are different from each other in mounting construction. In general, the latter is subjected to fixed fitting on a body panel of the vehicle through a sealing gasket.

FIG. 1 is a perspective view showing a conventional mounting construction of window glass 10 in a rear quarter portion of the vehicle body. FIG. 2 are sectional views taken along a line II—II of FIG. 1 in which three types of fixed mountings are shown according to differences in mounting construction. In FIGS. 2(A) and (B), the window glass 10 is fixed to the quarter portion through a weather strip 12 functioning as gasket and the weather strip 12 is provided at its outer face with a moulding 16. In FIG. 2(C), the window glass 10 is fixed to the quarter portion through a resin clip 14 and the resin clip 14 is secured thereto with the moulding 16.

In the types of FIGS. 2(A) and (B), however, the weather strip 12 can not be reduced in its thickness since its operation as gasket must be maintained and, therefore, the moulding 16 is disposed at a position projected largely from an outer face of the window sealed glass 10 outwardly by an amount of H, which results in increase in air resistance when the vehicle is operating particularly at high speeds. It also detracts from the appearance of the vehicle. In the type of FIG. 2(C), the resin clip 14 supporting the moulding 16 must be given a predetermined rigidity, so that it can not be reduced to any significant extent in thickness.

Accordingly, for example, Japanese Utility Model Laid-Open Publications Nos. 57-14113 and 58-135310 appear to be intended to solve these problems.

SUMMARY OF THE INVENTION

In view of the above facts, the present invention has as its object the provision of a mounting construction of window glass for a vehicle in which a projected amount of a moulding from the window sealed glass can be reduced, so that air resistance of the vehicle is reduced when the vehicle is being operated, while not impairing the appearance of the vehicle.

In a mounting construction of window glass of a fixed type for a vehicle according to the present invention, a retainer supporting a window glass is fixed to a body panel of the vehicle, a sealer is disposed between the window glass and a body panel of the vehicle, and a moulding is disposed to cover an outer face of a peripheral portion of the window glass, whereby the moulding projecting from the window glass is reduced.

The accompanying drawings, which are incorporated and constitute part of the specification, illustrate the preferred embodiments of the invention and, together with the description, serve to explain the principles of the invention.

PREFERRED EMBODIMENTS OF THE INVENTION

Reference will now be made in detail to presently preferred embodiments of the invention, examples of which are illustrated in the accompanying drawings.

Figure 1:
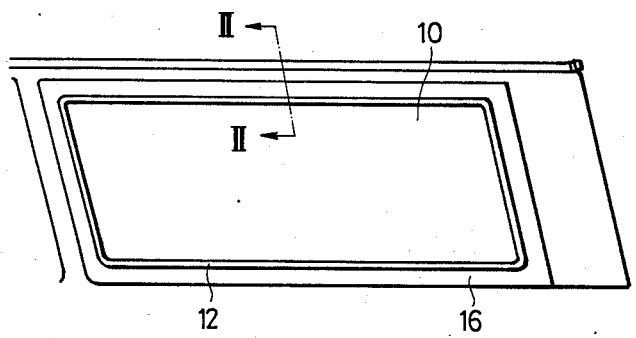
FIG. 1 is a perspective view of a conventional mounting construction of window sealed glass.
Figure 2A:
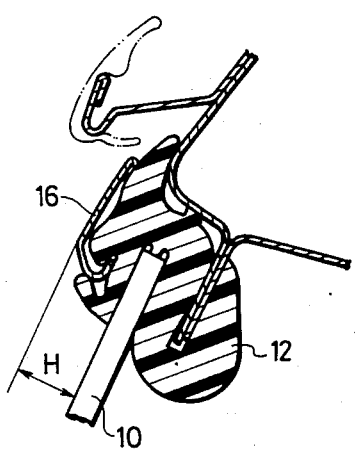
FIGS. 2(A), (B) and (C) are sectional views taken along a line II—II of FIG. 1.
Figure 2B:
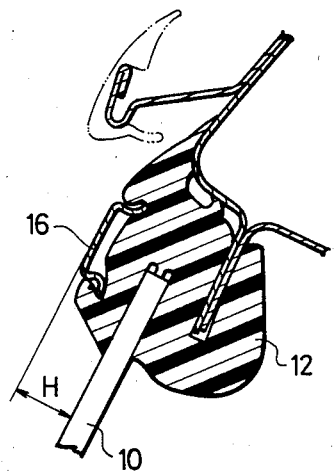
Figure 2C:
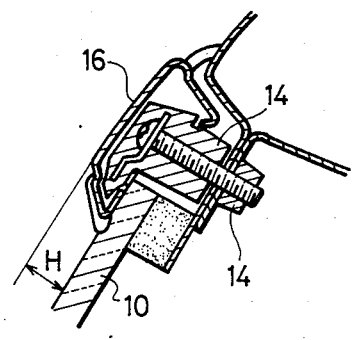
Figure 3:
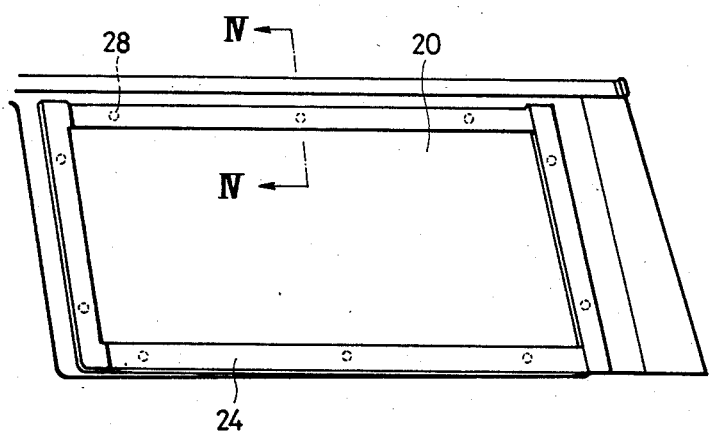
FIG. 3 is a perspective view showing a mounting construction of window sealed glass of a first embodiment according to the present invention.

In FIG. 3, shown is a window glass or windshield 20 fixed to a quarter portion of a vehicle body, according to the mounting construction of the present invention. Also, FIG. 4 is a sectional view of the mounting construction.

Figure 4:
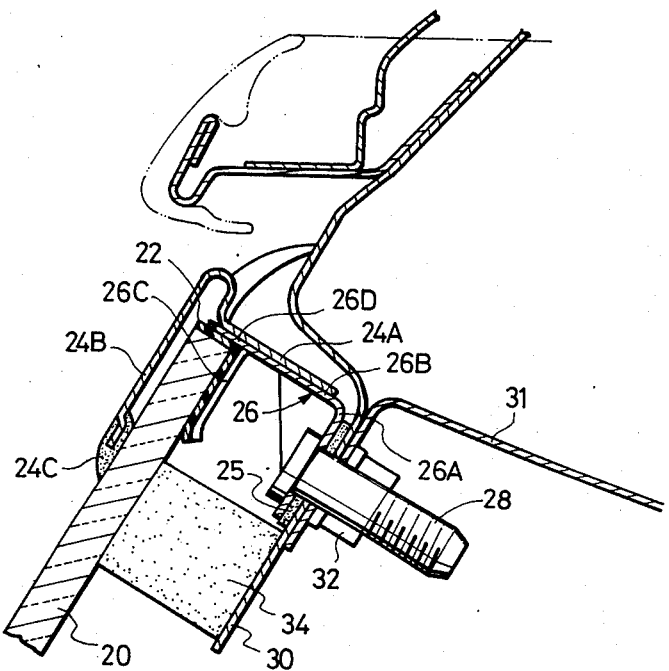
FIG. 4 is a sectional view taken along a line IV—IV of FIG. 3.
Figure 5:
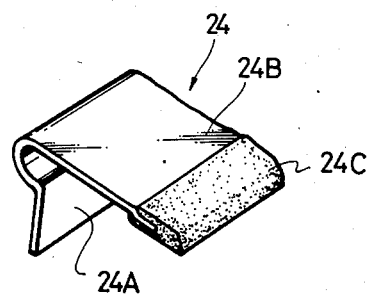
FIG. 5 is a perspective view showing a moulding of the first embodiment.

The window glass 20 is provided at its peripheral portion with a moulding 24 which is made of stainless steel and has a base portion 24A and an upper panel portion 24B, as shown in FIG. 4. That is to say, the moulding 24 has a sectional configuration of a substantial L shape, as shown in FIG. 5. The moulding 24 is fixed to its end periphery with resin material 24C for decorating the periphery of the window glass 20.

The moulding 24 is fixed along the base portion 24A to a retention plate, such as retainer 26, by a spot welding or the like, as shown in FIG. 4.

Figure 6:
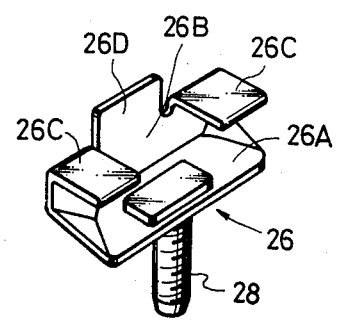
FIG. 6 is a perspective view showing retainer of the first embodiment.

The retainer or retention member 26 has a base plate portion 26A fixed thereto with a bolt 28 as fixing means. The retainer 26 also includes a side plate portion 26B extended substantially at a right angle from the base plate portion 26B. The side plate portion 26B is formed at its both side portions with two bent portions 26C (i.e., a retention plate portion having a pair of support arms), bent in such a directions that the bent portions 26C, the side plate portion 26B and the base plate portion 26A constitute a channel, as shown in FIGS. 4 and 6. Accordingly, the bent portions 26C and the upper panel portion 24B are positioned extended substantially in parallel with each other and the window sealed glass 20 is received between the moulding 24 and a cushion abutting on the bent portions 26C. The side plate portion 26B has at its intermediate portion, i.e., between the bent portions 26C, a projection portion 26D extended outwardly, as shown in FIGS. 4 and 6. The projection portion 26D abuts on cushion means 22 extending along an inner surface and an end face of the window sealed glass 20.

The bolt 28 penetrates the retainer 26 and body panels 30 and 31, and it is fixed to the body panel 31 from inside thereof by a nut 32. In this connection, disposed between the base plate portion 26A of the retainer 26 and the body panel 30 is a sealer 25, or sealing material, for preventing water from leaking into the vehicle compartment. Disposed between the body panel 30 and the window glass 20 is a sealer 34 for sealing a space therebetween, and a conventional sealer, i.e., conventional sealing material for vehicle, can sufficiently be applied to the present invention.

In this embodiment the cushion means 22 is made of an elastic body such as a rubber or polyvinyl chloride resin. In accordance with this embodiment, the moulding 24 does not project significantly from the outer face of the window glass 20, so that the projected amount of the moulding 24 is substantially reduced to be largely the thickness of the upper panel portion 24B of the moulding 24. In addition, when an external force acts upon an outside face of the window glass 20, the force can be sustained by the bent portions 26C of the retainer 26, and when an external force acts upon an inside face thereof, it can also be sustained by the moulding 24. Accordingly, a sufficient strength can be obtained without using a weather strip or a resin clip in the embodiment.

Figure 7:
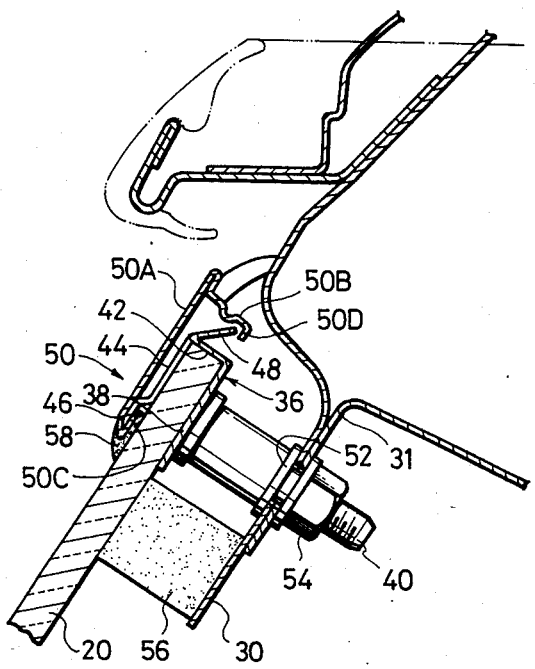
FIG. 7 is a sectional view of a second embodiment corresponding to FIG. 4.
Figure 8:
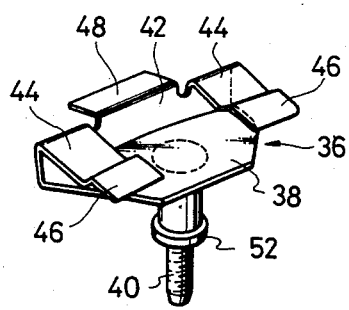
FIG. 8 is a perspective view showing a moulding of the second embodiment.
Figure 9:
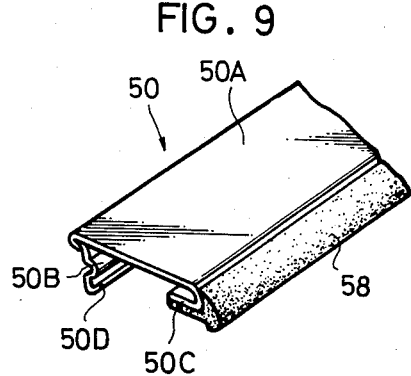
FIG. 9 is a perspective view showing a retainer of the second embodiment.

According to a second embodiment of the present invention, a window glass 20 is fixed to its peripheral portion with a retention clip or retainer 36 through a bonding agent or the like, as shown in FIG. 7. The retainer 36 has a base plate portion 38 supporting a bolt 40 as fixing or retention means and a side plate portion 42 bent substantially at a right angle from the base plate portion 38. As shown in FIG. 8, side plate portion 42 supports two bent portions 44 disposed at opposite sides of the side plate portion 42 and bent in such a direction that the window glass 20 is grasped between the base plate portion 38 and the bent portions 44. Each of the bent portions 44 is further formed at its forward end portion with a step portion 46. In addition, the side plate portion 42 is formed at its intermediate portion, i.e., between the bent portions 44, with a projection portion 48 projected in a direction away from the bent portions 44. The window sealed glass 20 is received between the bent portions 44 and the base plate portion 38, and a moulding 50 described in detail later on is engaged with the step portions 46 and the projection portion 48, as shown in FIG. 7.

The bolt 40 is welded on to the retainer 36 and the belt 40 includes, along its intermediate portion, a flange 52 as a sealing member. The flange 52 is caused to abut on the inside face of the body panel 30 to keep constant a space between the window glass 20 and the body panel 30. Therefore, the flange 52 functions as a spacer. In addition, the bolt 40 penetrates the body panels 30 and 31 to be fixed to the body panels 30 and 31 by a nut 54 from an inside of the vehicle body.

The retainer 36 is preferably made of substantially flexible metal material, such as stainless steel or spring material.

The moulding 50 including an upper panel portion 50A and an inwardly projecting side panel portion 50B has a sectional configuration of an approximate L shape and the upper panel portion 50A and the side panel portion 50B are respectively formed at their edge portions of a sectional direction thereof with hook portions 50C and 50D bent towards insides of the L shape as shown in FIG. 7. Therefore, the moulding 50 is engagable with the retainer 36 through the hook portions 50C and 50D. Also, the moulding 50 is fixed at its forward end portion with resin material 58 which abuts on an outer face of the window sealed glass 20.

In addition, disposed between the window glass 20 and the body panel 30 is a sealer 56 as in the first embodiment, whereby a sealing therebetween is maintained. In this embodiment, also, the conventional sealer can be used as well in the first embodiment.

According to the embodiment of the present invention, the moulding 50 is not disposed to project significantly from the outer face of the window glass 20. In addition, when an external force acts upon an outside face of the window glass 20, it can be sustained by the retainer 38 and the flange 52, and when an external force acts upon an inside face thereof, it can be sustained by the bent portions 44 of the retainer 36. Thus, a sufficient strength can be obtained even without using the weather strip or the resin clip of the first embodiment.

In the above two embodiments, typically ten sets of the retainers and the bolts are applied to the window glass 20, as shown in FIG. 3; however, the number of the set may be depending on the size or mounting condition of the window glass 20.

The configurations of the retainer and the moulding are not limited only to those of the first and second embodiments but they can be changed or modified appropriately, if necessary.

In the embodiment the retainer is connected to the body panel through the bolt but the other connecting means can also be applied to the present invention.

It will be apparent to those skilled in the art that modifications and variations can be made to the window glass mounting construction of the present invention. The invention in its broader aspects is, therefore, not limited to the specific details, representative apparatus, and illustrative examples shown and described. Thus, it is intended that all matter contained in the foregoing description or shown in the accompanying drawings shall be interpreted as illustrative and not in a limiting sense.

What is claimed is:

1. A mounting apparatus for a fixed vehicle window, comprising:
    a window glass having an inner surface, an outer surface, and an end surface;
    a vehicle body extending adjacent to the periphery of said window glass and having an interior portion facing said inner surface;
    a retention member secured to said interior portion of said vehicle body for supporting said window glass, said retention member having a base plate portion secured to said interior portion and a side plate portion extending both outward from said base plate portion and between said interior portion of the vehicle body and said window glass, said retention member also including a retention plate portion extending from said side plate portion and aligned along said inner surface for limiting movement of said window glass toward said interior portion of the vehicle body, said retention member further including a projection plate portion extending from said side plate portion and terminating along said end surface proximate a junction of said outer and end surfaces, said projection plate portion being aligned along said end surface for restricting said window glass from sliding relative to said retention plate portion;
    a molding member adapted to be rigidly attached to said retention member along said projection plate portion and said side plate portion, said molding member also including a panel portion spaced slightly outwardly of and substantially parallel to said outer surface, said panel portion and said retention plate portion clamping said window glass therebetween with said window glass spaced from said interior portion of said vehicle body, for limiting movement of said window glass away from said interior portion, and for minimizing wind resistance when the vehicle is operated at increased speeds; and sealing means mounted along the periphery of said window glass between said inner surface of said window glass and said interior portion of said vehicle body for weather sealing the vehicle window.

2. The mounting apparatus defined in claim 1, wherein said retention plate portion defines a pair of support arms spaced from said interior portion, each of said pair of support arms having a planar surface substantially adjacent said inner surface to restrict movement of said window glass in the direction of said interior portion of said vehicle body.

3. The mounting apparatus defined in claim 2, wherein said retention member includes cushion means extending along said inner surface and said end surface and between said retention member and said window glass.

4. The mounting apparatus defined in claim 3, wherein said molding member includes a base portion adapted to be affixed to said retention member, said base portion being integrally formed with said panel portion, said molding member also including a resinous trimming secured to said panel portion to engage said outer surface.

5. The mounting apparatus defined in claim 4, wherein said base portion is substantially perpendicular to said panel portion.

* * * * *